US010754297B2

United States Patent
Bostick et al.

(10) Patent No.: US 10,754,297 B2
(45) Date of Patent: *Aug. 25, 2020

(54) DETERMINE AND PROJECT HOLOGRAPHIC OBJECT PATH AND OBJECT MOVEMENT WITH MULTI-DEVICE COLLABORATION

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/681,975

(22) Filed: Nov. 13, 2019

(65) Prior Publication Data

US 2020/0081400 A1 Mar. 12, 2020

Related U.S. Application Data

(63) Continuation of application No. 15/850,358, filed on Dec. 21, 2017, now Pat. No. 10,571,863.

(51) Int. Cl.
*G03H 1/26* (2006.01)
*G03H 1/00* (2006.01)
*G03H 1/22* (2006.01)

(52) U.S. Cl.
CPC ........... *G03H 1/268* (2013.01); *G03H 1/0005* (2013.01); *G03H 1/2294* (2013.01);
(Continued)

(58) Field of Classification Search
CPC .. G02B 27/0101; G02B 27/0109; G03H 1/00; G03H 1/0443; G03H 1/20; G03H 1/26
See application file for complete search history.

(56) References Cited

U.S. PATENT DOCUMENTS 3,600,056 A * 8/1971 King, Jr. .................. G03H 1/00
359/12
4,333,006 A * 6/1982 Gorin .................. G02B 26/106
235/462.34

(Continued)

FOREIGN PATENT DOCUMENTS

| CN | 104571512 A | 4/2015 |
| CN | 104980722 A | 10/2015 |
| WO | 2016/043897 A1 | 3/2016 |

OTHER PUBLICATIONS

Implementation of Holographic View in Mobile Video Calls; Ram; 2013 (Year: 103).*

(Continued)

*Primary Examiner* — Luis Perez-Fuentes
(74) *Attorney, Agent, or Firm* — James Nock; Hunter E. Webb; Keohane & D'Alessandro, PLLC

(57) ABSTRACT

Embodiments described herein provide a solution for providing a holographic projection. A plurality of holographic projecting mobile devices that are within a physical area are identified. A set of holographic object paths that can be projected using the identified holographic projecting mobile devices is determined. A holographic object path is selected from this set of holographic object paths. A holographic object is projected moving according to the holographic object path by the plurality of holographic projecting mobile devices.

20 Claims, 8 Drawing Sheets

(52) U.S. Cl.
CPC . *G03H 2001/0088* (2013.01); *G03H 2225/60* (2013.01); *G03H 2226/02* (2013.01)

(56) References Cited

U.S. PATENT DOCUMENTS

| | | | |
|---|---|---|---|
| 6,323,971 | B1 | 11/2001 | Klug |
| 8,873,119 | B2 | 10/2014 | Lee et al. |
| 8,950,096 | B2 * | 2/2015 | Justin, III ............ G03H 1/0005 40/455 |
| 10,410,523 | B1 * | 9/2019 | Bostick ................ G01C 21/367 |
| 10,571,863 | B2 * | 2/2020 | Bostick ................ G03H 1/0005 |
| 2009/0109176 | A1 | 4/2009 | Fein et al. |
| 2010/0067077 | A1 | 3/2010 | Kroll et al. |
| 2010/0105325 | A1 | 4/2010 | Halla et al. |
| 2011/0205101 | A1 | 8/2011 | Mardirossian |
| 2012/0170089 | A1 | 7/2012 | Kim et al. |
| 2014/0169569 | A1 | 6/2014 | Toivanen et al. |
| 2014/0368537 | A1 | 12/2014 | Salter et al. |
| 2017/0023911 | A1 * | 1/2017 | Russell .............. G02B 27/2292 |
| 2017/0358096 | A1 | 12/2017 | Boss et al. |
| 2018/0032127 | A1 * | 2/2018 | Adhia .................. G05B 19/056 |
| 2018/0213194 | A1 * | 7/2018 | Rakshit ................ G03H 1/2249 |
| 2019/0196404 | A1 * | 6/2019 | Bostick .................. G03H 1/268 |

OTHER PUBLICATIONS

New smartphone chip will beam high-definition holograms as early as 2015 (Year: 2015).*
New smartphone chip high-definition holograms, 2015; (Year: 2015).*
Implementation of Holographic View in Mobile Video Calls; Ram; 2013 (Year: 2013).*
NPL Internet Search log; 2019. (Year: 2019).*
Perez Fuentes, Luis M, U.S. Appl. No. 15/850,358, Office Action dated Apr. 26, 2019, dated Apr. 26, 2019, 17 pgs.
Ram et al., "Implementation of Holographic View in Mobile Video Calls", International Journal of Scientific & Engineering Research, vol. 4, Issue 9, Sep. 2013, 8pgs.
"New Smartphone chip will beam high-definition holograms as early as 2015", 2015, 11 pgs.
Google Internet Search Log, Holographic Hologram + theater projection, Apr. 23, 2019, 2 pgs.
PCT International Search Report and Written Opinion, International Application No. PCT/IB2018/060018, dated Apr. 17, 2019, 9 pages.
Perez Fuentes, Luis M, U.S. Appl. No. 15/850,358, Notice of Allowance dated Oct. 15, 2019, dated Oct. 15, 2019, 12 pgs.

* cited by examiner

DETERMINE AND PROJECT HOLOGRAPHIC OBJECT PATH AND OBJECT MOVEMENT WITH MULTI-DEVICE COLLABORATION

The present patent document is a continuation of U.S. patent application Ser. No. 15/850,358, filed Dec. 21, 2017, entitled "DETERMINE AND PROJECT HOLOGRAPHIC OBJECT PATH AND OBJECT MOVEMENT WITH MULTI-DEVICE COLLABORATION", the disclosure of which is incorporated herein by reference.

TECHNICAL FIELD

This invention relates generally to holographic visual image projection. More specifically, this invention is drawn to providing a holographic projection having an object path using multiple projection devices in collaboration.

BACKGROUND

In the past, the most common way of displaying video imagery was to project an image onto a flat screen, which shows the image in two dimensions (2-D). In recent years, methods of simulating a three-dimensional (3-D) image have been developed. One of these methods includes a user wearing stereoscopic glasses to allow each of the user's eyes to see a different perspective of a representation of an object. In theory, the user's mind combines the images from each eye, creating, to the user, the appearance of 3-D depth. However, the 3-D effect produced by stereoscopic glasses cannot provide accurate depth cues or motion parallax. In other words, it is not possible for a user to move his/her head and observe a representation of an object from different angles.

Holograms, in contrast, can produce more realistic 3-D images. Holograms can allow a user to see different perspectives of a representation of a 3-D object from different angles and locations. Holograms can further provide a user with information about the size, shape, and color of a represented object. These holograms are generally created using lasers, which can produce complex light interference patterns, including spatial data, required to re-create a 3D object.

Recent advances in holographic projection have allowed the technology to be included in mobile devices. These advances can allow the user of the mobile device to create three dimensional video objects in the air using the mobile device.

SUMMARY

In general, embodiments described herein provide a solution for providing a holographic projection. A plurality of holographic projecting mobile devices that are within a physical area are identified. A set of holographic object paths that can be projected using the identified holographic projecting mobile devices is determined. A holographic object path is selected from this set of holographic object paths. A holographic object is projected moving according to the holographic object path by the plurality of holographic projecting mobile devices.

One aspect of the present invention includes a method for providing a holographic projection. The method comprises identifying a plurality of holographic projecting mobile devices within a physical area and determining a set of holographic object paths that can be projected using the plurality of holographic projecting mobile devices. The method further comprises selecting a holographic object path from the set of holographic object paths and projecting, by the plurality of holographic projecting mobile devices, a holographic object moving according to the holographic object path.

The method can optionally further comprise ascertaining a set of locations corresponding of each of the plurality of holographic projecting mobile devices within the area, wherein the set of holographic object paths is determined based on the set of locations. This method offers several advantages, including, but not limited to, permitting the selection of object paths that can be displayed by the holographic projecting mobile devices as they are currently located.

The method can optionally further comprise determining a set of projection ranges corresponding of each of the plurality of holographic projecting mobile devices within the area, wherein the set of holographic object paths is determined based on the set of projection ranges. This method offers several advantages, such as, but not limited to, permitting the selection of object paths that can be displayed by the holographic projecting mobile devices that accounts for the projection ranges associated therewith.

The method can optionally further comprise designating one holographic projecting mobile device of the plurality of holographic projecting mobile devices as a controlling device node and non-designated projecting mobile devices as secondary device nodes; and controlling, by the controlling device node, the secondary device nodes to perform the projecting. This method offers several advantages, such as, but not limited to, permitting the designation of a single holographic projecting device that exercises control over the other holographic projecting mobile devices to perform the projecting.

The method can optionally further comprise projecting, by a first holographic projecting mobile device of the plurality of holographic projecting mobile devices, the holographic object moving along a first section of the holographic object path associated with the first holographic projecting mobile device. This method further comprises calculating a transition point between the first section of the holographic object path and a second section of the holographic object path that is associated with a second holographic projecting mobile device of the plurality of holographic projecting mobile devices. Further, this method comprises ceasing the projecting of the holographic object by the first holographic projecting mobile device in response to an arrival of the holographic object at the transition point, and beginning a projection of the holographic object by the second holographic projecting mobile device in response to the arrival of the holographic object at the transition point. This method offers several advantages, such as, but not limited to, permitting a continued projecting of a holographic object as it crosses from the projection range of one device to another.

The method can optionally further comprise detecting for a relocation of a relocated holographic projecting mobile device of the plurality of holographic projecting mobile devices within the area. This method further comprises detecting for an addition of an additional holographic projecting mobile device to the plurality of holographic projecting mobile devices within the area. This method further comprises detecting for a removal of a removed holographic projecting mobile device from the plurality of holographic projecting mobile devices within the area. This method further comprises revising the set of holographic object paths that can be projected by the plurality of holographic projecting mobile devices based on a detection of any of the relocation, the addition, or the removal. This method offers several advantages, such as, but not limited to, dynamically adjusting the possible holographic object paths in response to the addition, removal, or relocation of a holographic projecting mobile device.

The method can optionally further comprise determining a set of new locations configured to enable a new holographic object path. Further, this method comprises forwarding a suggestion for a new location for a holographic projecting mobile device based on the determining. This method offers several advantages, such as, but not limited to, determining and providing suggestions regarding an improved positioning of holographic projecting mobile devices that will enable new holographic object paths.

Another aspect of the present invention includes a computer system for providing a holographic projection, the computer system comprising: a holographic projecting mobile device; a holographic projector controlled by the holographic projecting mobile device; a memory medium in the holographic projecting mobile device comprising program instructions; a bus in the holographic projecting mobile device coupled to the memory medium; and a processor coupled to the bus in the holographic projecting mobile device that executes the program instructions, causing the system to: identify a plurality of holographic projecting mobile devices within a physical area; determine a set of holographic object paths that can be projected using the plurality of holographic projecting mobile devices; select a holographic object path from the set of holographic object paths; and project, by the plurality of holographic projecting mobile devices, a holographic object moving according to the holographic object path.

Yet another aspect of the present invention includes a computer program product for providing a holographic projection, the computer program product comprising a computer readable storage device, and program instructions stored on the computer readable storage device, to: identify a plurality of holographic projecting mobile devices within a physical area; determine a set of holographic object paths that can be projected using the plurality of holographic projecting mobile devices; select a holographic object path from the set of holographic object paths; and project, by the plurality of holographic projecting mobile devices, a holographic object moving according to the holographic object path.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
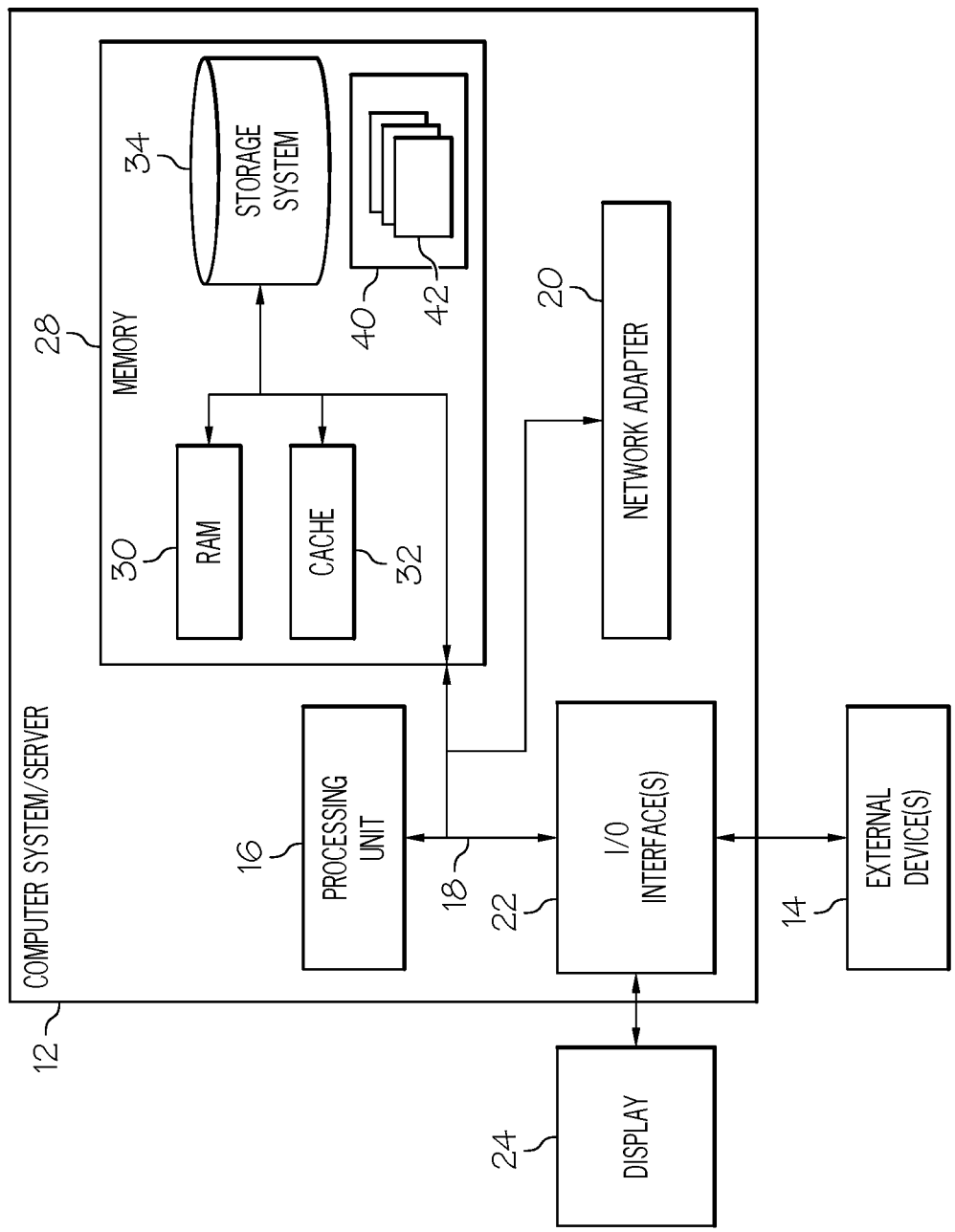
FIG. 1 shows an architecture in which the invention can be implemented according to an embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising" and the like, or "includes" and/or "including" and the like, when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the actions and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide a solution for providing a holographic projection. A plurality of holographic projecting mobile devices that are within a physical area are identified. A set of holographic object paths that can be projected using the identified holographic projecting mobile devices is determined. A holographic object path is selected from this set of holographic object paths. A holographic object is projected moving according to the holographic object path by the plurality of holographic projecting mobile devices.

Referring now to FIG. 1, a computerized implementation 10 for providing a holographic projection will be shown and described according to an embodiment. Computerized implementation 10 is only one example of a suitable implementation and is not intended to suggest any limitation as to the scope of use or functionality of embodiments of the invention described herein. Regardless, computerized implementation 10 is capable of implementing and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can include addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for providing a holographic projection. It should be understood that any other computers implemented under the present invention may have different components/software, but can perform similar functions. Computer system 12, as noted above in a non-limiting example, may be a server.

Computer system 12 in computerized implementation 10 is shown in the form of a general-purpose computing device. The components of computer system 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for providing a holographic projection, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and/or program data. Each of the operating system, one or more application programs, other program modules, program data and/or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
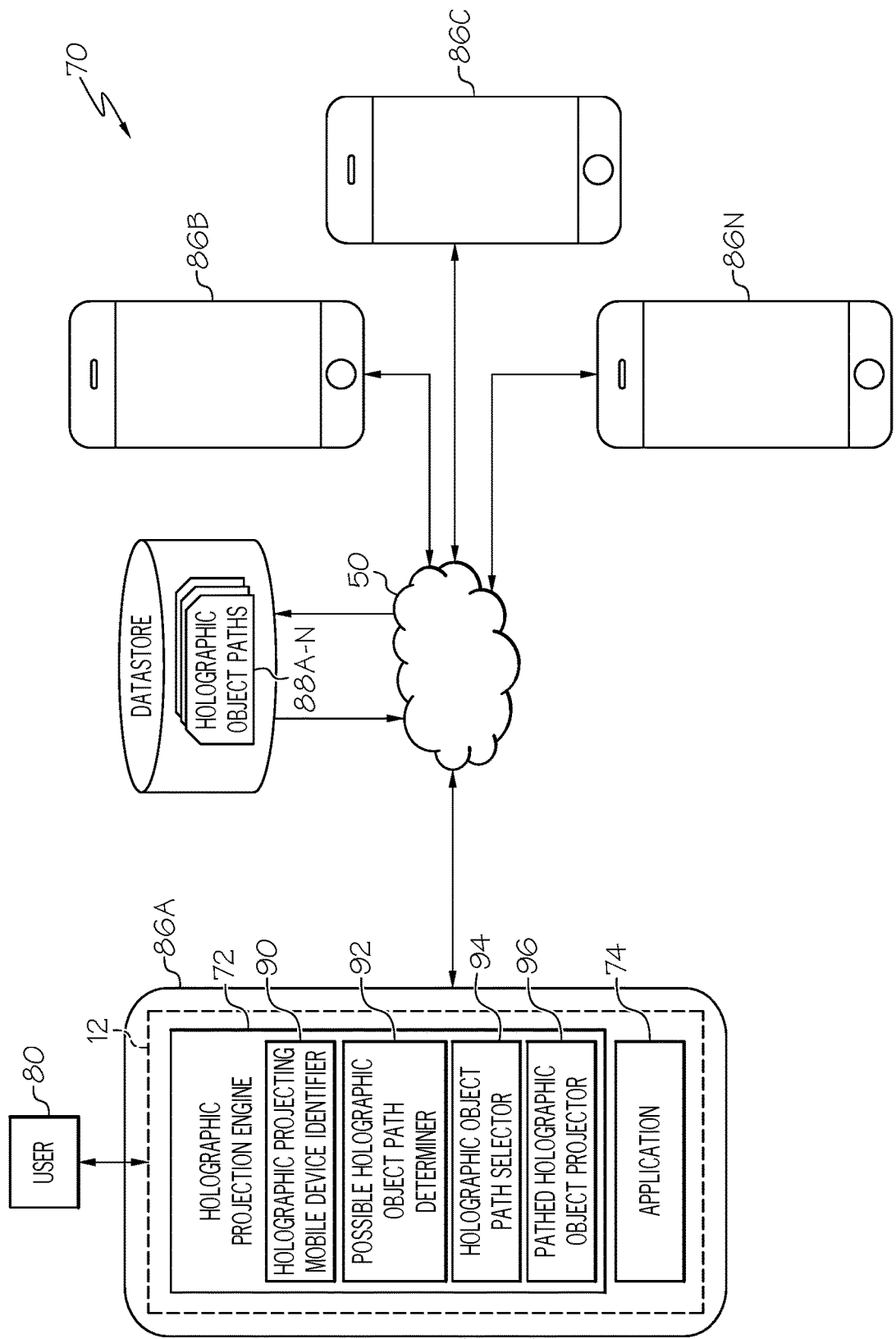
FIG. 2 shows a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 2 for illustrative purposes only. In the event the teachings recited herein are practiced in a networked computing environment 70, each client (e.g., holographic projecting mobile devices 86A-N) need not have a holographic projection engine (hereinafter "system 72"). Rather, all or part of system 72 could be loaded on a server or server-capable device that communicates (e.g., wirelessly) with the clients to provide device protection therefor. Regardless, as depicted, system 72 is shown within computer system/server 12 as embodied within a holographic projecting mobile device 86A. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to the projection of holographic images by holographic projecting mobile devices 86A-N in a networked computing environment. Such other system(s) have not been shown in FIG. 2 for brevity purposes.

Along these lines, system 72 may perform multiple functions similar to a general-purpose computer. Specifically, among other functions, system 72 can produce a holographic projection through collaboration between a number of holographic projecting mobile devices 86A-N in networked computing environment 70. To accomplish this, system 72 can include: a holographic mobile device identifier 90, a possible holographic object path determiner 92, a holographic object path selector 94, and a pathed holographic object projector 96. In any event, the technical effect of system 72 is to provide processing instructions to computer system/server 12 in order to provide a holographic projection.

Figure 3:
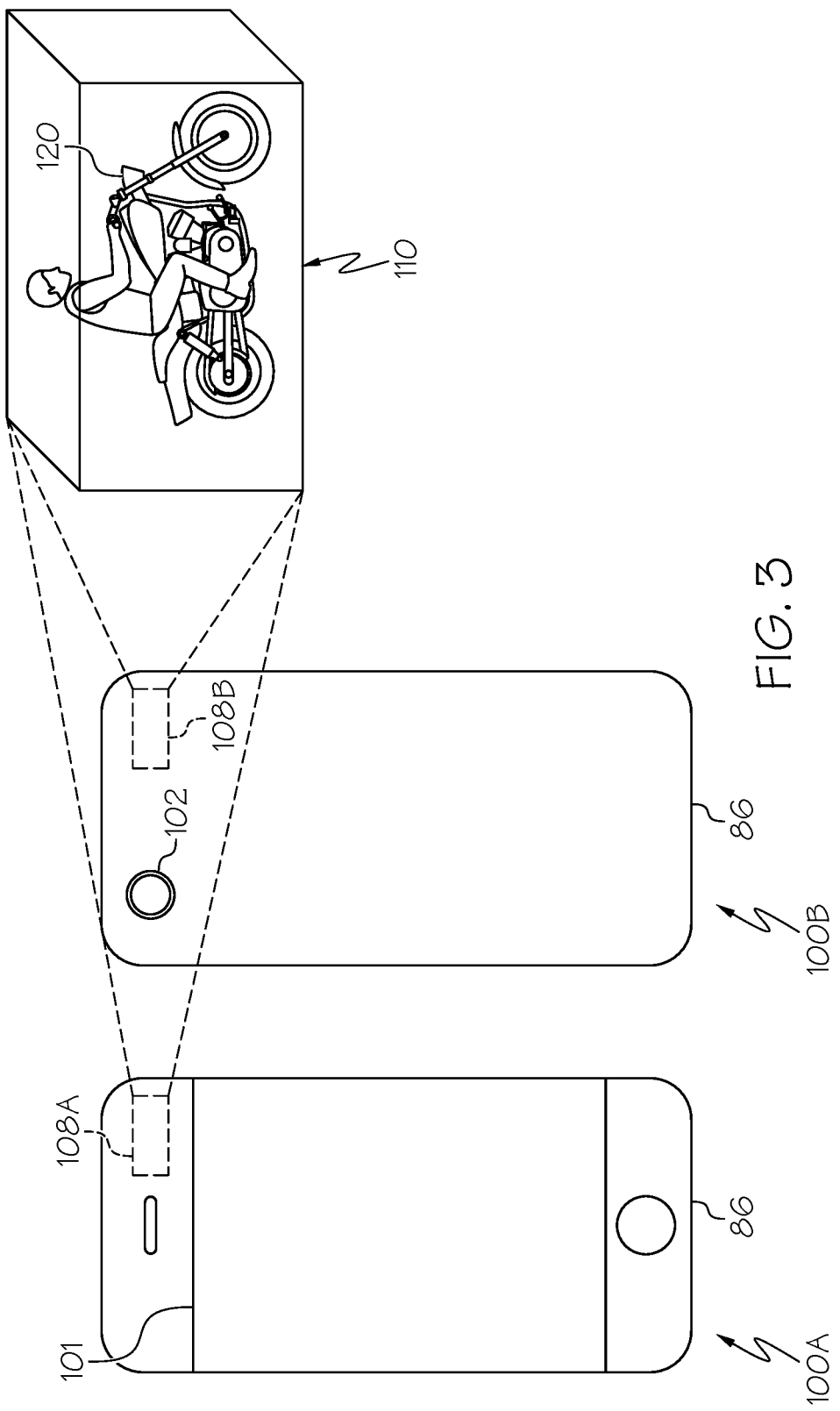
FIG. 3 shows front and back views of an example holographic projecting mobile device according to an embodiment of the present invention.

Referring now to FIG. 3, a front view 100A and a back view 100B of an example holographic projecting mobile device 86 according to an embodiment of the present invention are shown. One exemplary illustration of the holographic projecting mobile device 86 is smartphone 100A-B having a display screen 101 and an image capture unit, such as camera 102. In another embodiment, holographic projecting mobile device 86 may include, but is not limited to, a wireless subscriber unit, user equipment (UE), mobile station, pager, cellular telephone, telephone, personal digital assistant (PDA), tablet computer, appliance, internet pad, digital music player, media player, video game device, head-mounted display (HMD), helmet mounted display (HMD), glasses, goggles, or other suitable electronic device. In any case, as shown, holographic projecting mobile device 86 also includes at least one holographic projector 108A-B. Holographic projector 108A-B can be located on front 100A of holographic projecting mobile device 86 (e.g., holographic projector 108A), on back 100B of holographic projecting mobile device 86 (e.g., holographic projector 108B), on either side of holographic projecting mobile device 86 (not shown), and/or on the top and/or bottom of holographic projecting mobile device 86 (not shown). Further, multiple holographic projectors 108A-B may be included on a single holographic projecting mobile device 86, in order to, for example, provide a more three dimensional appearance to a projected holographic image 110. Alternatively, holographic projector 108A may be part of an external device (not shown) that is controlled by holographic projecting mobile device 86. Examples of such an external device may include, but are not limited to, a case adapted to be used with holographic projecting mobile device 86, a module that can be integrally connected with holographic projecting mobile device 86, a stand-alone device that can be connected to an external port of holographic projecting mobile device 86, and/or the like.

In any case, holographic projecting mobile device 86 can control holographic projector 108A-B to project holographic image 110. In an embodiment, holographic projector 108A-B projects a white light and/or one or more lasers through an interference pattern to produce the holographic image 110 to be projected. In some embodiments, multiple holographic projectors 108A-B and/or spinning mirrors within one or more holographic projector 108A-B can be used to produce an improved three dimensional effect. It should be understood that the above-described techniques and/or apparatuses used by holographic projector 108A-B as included in and/or controlled by holographic projecting mobile device 86 are intended to be illustrative and should not be taken as limiting. In contrast, any solution for generating a holographic image now known or later developed should be envisioned.

The inventors of the invention described herein have discovered certain deficiencies in the current solutions for generating holographic projections. For example, even for a holographic projecting mobile device 86 that has multiple holographic projectors 108A-B, the holographic image 110 that is projected therefrom has a range of movement that is limited by the location of the holographic projecting mobile device 86. This limitation makes the use of a single holographic projecting mobile device 86 to project holographic images that travel from one place to another within a physical area (e.g., along a pre-determined path) difficult if not impossible. Adding additional holographic projecting mobile devices 86A-N has, to date, been ineffective for remedying the deficiencies because there has previously been no way of coordinating the displays of the holographic projecting mobile devices 86A-N.

Consider applications that have multiple moving objects. For example, assume that a plurality of users wish to play a race game on a mobile device and to compete with one another within the game. Current solutions provide split screen view, or view of the road or track with positions of cars. However, at present, it is not possible to project a holographic object such as a race car on a race track in an environment in which multiple users with mobile devices can participate and in which the objects are projected holographically for a 3D visualization. One reason is because of differences in the way the holographic object movement path for projection is determined across devices, which depends on the number of people collaborating with mobile devices.

In another scenario, consider business, social, or gaming apps that allow a number of users to collaborate with multiple mobile devices. For example, two users on smart phones may be collaborating about a business application or game, and there may be a need as part of the application to visually transfer a 3D holographic object from one device to another. Using present solutions, the users may experience a gap in the holographic display between two devices as the digital object moves from one device to another. This gap between two or more devices could similarly exist in the case that such a transfer is visualized by the two devices by means of a holographic object. As such, there is no current solution that allows for visual movement of holographic objects between devices through a coordinated projection of hologram(s). Accordingly, there is a need for a solution that can determine a seamless or substantially seamless holographic object movement path across multiple devices, such that the projection of the holographic objects and background can show visual movement of holographic objects dynamically based on the position of participating devices.

The approaches described herein contain numerous advantages over present solutions. For example, the present invention allows multiple mobile devices that are able to generate holographic images to collaborate to generate a composite holographic image. This composite holographic image includes one or more holographic objects that travel seamlessly across the display areas of multiple mobile devices and, optionally, the path along which the objects are traveling. This path is selected and optimized based on the characteristics of the mobile devices that are generating the holographic projection. To this extent, complex holographic images can be generated using devices that can be possessed by any user and without the need for the complex dedicated holographic projection systems that must currently be used. Further, the approaches described herein facilitate setup of a multi-camera holographic projection system without the need for extensive trial and error repositioning of cameras, saving time and resources.

Referring again to FIG. 2, holographic projecting mobile device identifier 90 of system 72, as executed by computer system/server 12, is configured to identify a plurality of holographic projecting mobile devices 86A-N within a physical area. To accomplish this, holographic projecting mobile device identifier 90 can use any communications solution now known or later developed, including but not limited to: device-based communication solutions such as peer-to-peer Wi-Fi, Bluetooth, near field communications, infrared communications, and/or the like. Additionally or in the alternative, holographic projecting mobile device identifier 90 can utilize external communication solutions provided within the physical area, such as: client/server-based Wi-Fi, wireless, beacon-based communications, satellite, and/or the like. In any case, the physical area can be any location in which a plurality of holographic projecting mobile devices 86A-N are located and within which projected holographic image 110 is desired, including, but not limited to: a room in a dwelling, a conference room or other location in which a business meeting may be conducted, a classroom, an outdoor space where people are gathered, a stadium or arena, and/or the like.

In an embodiment, holographic projecting mobile device identifier 90 can be configured to detect all holographic projecting mobile devices 86A-N within a particular physical distance range (e.g., within 10 meters). Additionally, or in the alternative, other determinations can be used for selecting among holographic projecting mobile devices 86A-N, including, but not limited to: devices within the same room, devices within a visual line of sight, and/or the like. Alternatively, holographic projecting mobile device identifier 90 can be configured to detect only holographic projecting mobile devices 86A-N that have one or more specific characteristics, which may include, but are not limited to: devices of a particular device type (e.g., make, model, etc.), devices that have holographic projection capability, devices that have a particular type of holographic projection capability, devices that are running a particular application 74 (e.g., that is configured to utilize holographic projection), etc.

Detection of holographic projecting mobile devices 86A-N by holographic projecting mobile device identifier 90 can be initiated in response to one or more events. In an embodiment, one or more holographic projecting mobile devices 86A-N may be constantly scan or periodically poll the physical area surrounding the device to determine whether other holographic projecting mobile devices 86A-N are present within the physical area. In an embodiment, an application 74 that utilizes and/or controls the at least one holographic projector 108A-B of a holographic projecting mobile device 86A-N may operate in the background to perform the detection process. Additionally, or in the alternative, application 74 can initiate the detection process in response to a request by user 80 to activate application 74. Additionally, or in the alternative, application 74 may include a control (e.g., a button, switch, etc.) that, when activated by user 80, initiates the detection process. In any case, application 74, if present, may include one or more of: a holographic device controller, a multi-player gaming application, a file transfer application, a device-to-device communication/interaction application, a collaboration application, and/or any other application for which multi-device holographic projection may be desired.

In any case, as part of the discovery process, holographic projecting mobile device identifier 90 can also gather technical information about holographic projecting mobile devices 86A-N. For example, holographic projecting mobile device identifier 90 can gather technical data about the holographic projectors 108A-B associated with each of the holographic projecting mobile devices 86A-N. This technical data can be used to determine a set of projection ranges corresponding of each of the plurality of holographic projecting mobile devices 86A-N within the area. Further, holographic projecting mobile device identifier 90 can ascertain a set of locations corresponding to each of the plurality of holographic projecting mobile devices 86A-N within the area. These locations can be ascertained using location data stored on the devices 86A-N themselves and/or using (e.g., triangulation based on) the signals from the devices 86A-N by the devices 86A-N themselves or external communication solutions provided within the physical area. Based on this, a relative position of each holographic projecting mobile device 86N with respect to all other holographic projecting mobile devices 86A-N can be ascertained.

In an embodiment, a single one of holographic projecting mobile devices 86A-N can be designated as a controlling device node 86A. This designation may be performed automatically by system 72 based on such factors as: make/model of the device, processor speed of the device, networking connectivity strength of the device, a presence of a particular application 74 on the device and/or the like. Alternatively, system 72 may designate the first device that starts the application 74 as controlling device node 86. The designation can also be made or changed based on a designation by one or more users 80. For example, users 80 may nominate and/or vote for which device should be controlling device node 86A or one user 80 can indicate that the device associated with the user is to be controlling device node 86A. In any case, once a device is designated as controlling device node 86A, all other (non-designated) devices are designated as secondary device nodes 86B-N. In an embodiment, controlling device node 86A may perform all or substantially all of the functions of holographic projecting mobile device identifier 90 to identify secondary device nodes 86B-N.

For example, assume that a group of users 80 that have holographic projecting mobile devices 86A-N want to play a multi-player game (e.g., a racing game). The users may all assemble into a common physical area (e.g., the family room of a house) with their holographic projecting mobile devices 86A-N. One or more users may activate application 74 for operating the game, initiating the discovery of the co-located holographic projecting mobile devices 86A-N by holographic projecting mobile device identifier 90, and, optionally, the designation of one of the holographic projecting mobile devices 86A-N as controlling device node 86A and the other devices as secondary devices 86B-N. The location of each of holographic projecting mobile devices 86A-N is ascertained and projection ranges for each of the holographic projecting mobile devices 86A-N is determined.

Continuing to refer to FIG. 2, possible holographic path identifier 92 of system 72, as executed by computer system/server 12, is configured to determine a set of holographic object paths 88A-N that can be projected using the plurality of holographic projecting mobile devices. Holographic object paths 88A-N are paths along which a holographic object 120 is allowed to move. A particular holographic object path 88N may be a path that begins at one location and ends at another or may be a closed loop. A particular holographic object path 88N may be visible within holographic projection 110 or, alternatively, may be invisible. For example, in the case of the previously described racing game example, the holographic object path 88N may include a roadway, a waterway, a path, a track, a set of landscape features and/or the like. Similarly, if the holographic object 120 is a train car, holographic object path 88N may include a railroad track, trolley tracks, monorail track, guide-wire, and/or any other like feature. Alternatively, if holographic object 120 is a file or other data that is being sent from one holographic projecting mobile device 86A to another of other holographic projecting mobile devices 86A-N, holographic object path 88N may be invisible or may include an illustrated path (e.g., line, curve, rainbow, road, waterway, or other illustration), which may optionally have animations (e.g., blinking, flashing, increased/decreased brightness, color change, etc.) that are designed to reflect movement.

In any case, the number of holographic object paths that are included in the set can depend on a number of different factors including, but not limited to: the application 74 used to generate the holographic object paths 88A-N, the number of holographic projecting mobile devices 86A-N identified by holographic projecting mobile device identifier 90, the relative locations of the holographic projecting mobile devices 86A-N identified by holographic projecting mobile device identifier 90, the projection ranges of holographic projecting mobile devices 86A-N identified by holographic projecting mobile device identifier 90, and/or the like. For example, the specific application 74 selected may have 1-n possible holographic object paths 88A-N along which holographic objects 120 supported by the application 74 are permitted to travel. Depending on the number of holographic projecting mobile devices 86A-N identified by holographic projecting mobile device identifier 90, the number of available object movement paths may be limited based on the ability to provide seamless or relatively seamless holographic projection of the object movement path across the holographic projecting mobile devices 86A-N.

To this extent, possible holographic path identifier 92 can retrieve (e.g., from datastore 34) a set of possible holographic object paths 88A-N that are supported by application 74 (e.g., race game). These retrieved holographic object paths 88A-N can include dimensions and/or shape settings necessary to display each holographic object path 88N including attributes such as curves, straightaways, changes in vertical elevation, etc. The technical information gathered by holographic projecting mobile device identifier 90 can then be used to determine which of the possible holographic paths 88A-N can be projected by the identified holographic projecting mobile devices 86A-N. For example, if the number of holographic projecting mobile devices 86A-N being used is relatively small, the holographic object paths 88A-N that can be projected by the holographic projecting mobile devices 86A-N may be limited. In an embodiment, possible holographic path identifier 92 can determine which holographic paths 88A-N are able to be displayed based on the relative locations of holographic projecting mobile devices 86A-N ascertained by holographic projecting mobile device identifier 90. In an embodiment, possible holographic path identifier 92 can determine which holographic paths 88A-N are able to be displayed based on the projection ranges of the holographic projecting mobile devices 86A-N determined by holographic projecting mobile device identifier 90.

This technical information can be analyzed using curve fitting techniques to calculate which of the available holographic object paths 88A-N can be projected by holographic projecting mobile devices 86A-N. Such techniques can include, but are not limited to: linear curve fitting (linear regression), polynomial curve fitting, overfit/underfit, exponential curve fitting, and/or any other curve fitting technique now known or later developed. Any of these techniques can be utilized for the entirety of or, alternatively, for any segment of the holographic object path. For example, for a case of a polynomial curve fitting technique, a first-order curve can be obtained using the following equation:

$$f(x)=ax+b$$

This can be extended to a curve for a polynomial of any order j, using the equation:

$$f(x) = a_0 + a_1x + a_2x^2 + a_3x^3 + \ldots + a_jx^j = a_0 + \sum_{k=1}^{j} a_kx^k$$

In any case, possible holographic object path determiner 92 can compare the curves generated using any of the curve fitting techniques, which are based on the locations of the holographic projecting mobile devices 86A-N, with a set of possible holographic object paths 88A-N to determine the holographic object paths 88A-N that can be projected by the holographic projecting mobile devices 86A-N. The calculation of these curves can also take into account the relative size and/or characteristics of the holographic object 120 (FIG. 3) (e.g., train, car, motorcycle, ball, etc.) that is to be displayed traveling along the holographic object path 88N.

Figure 4:
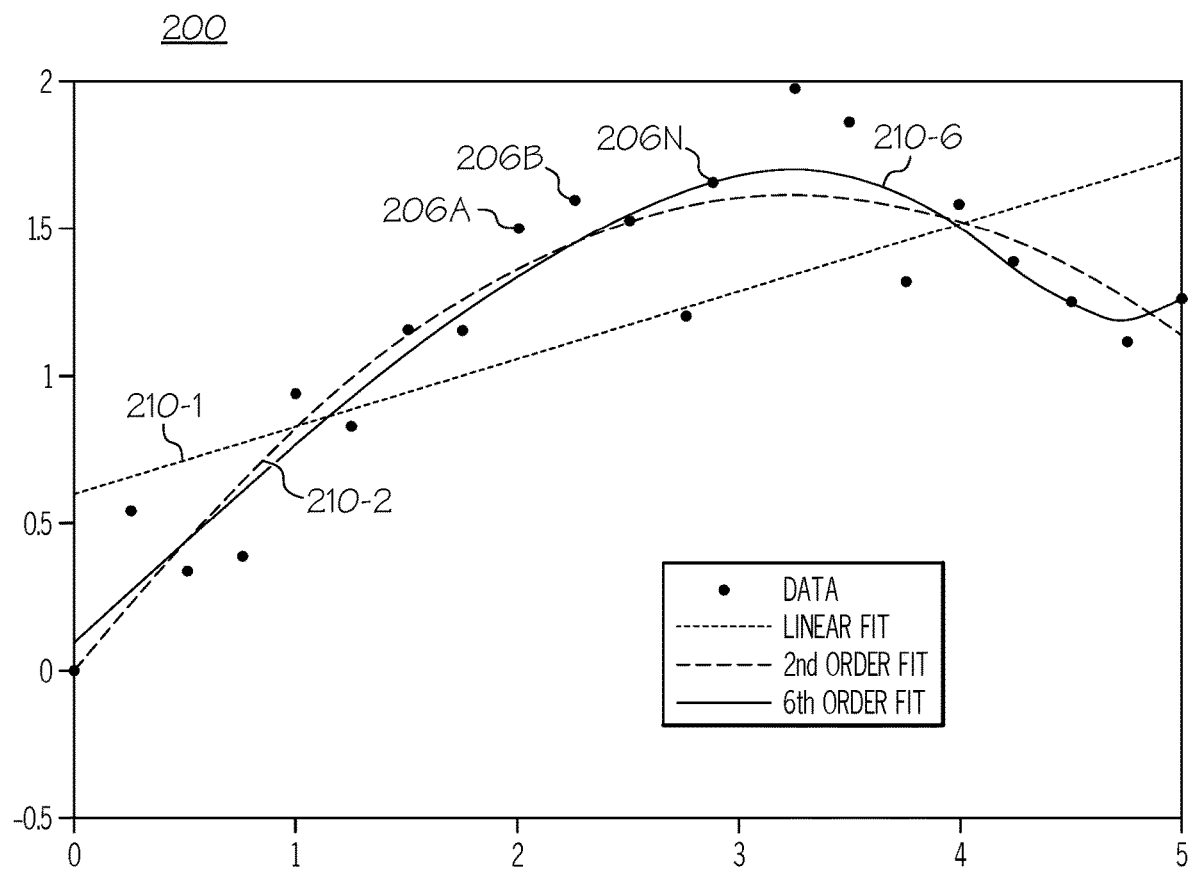
FIG. 4 shows a graphic of example polynomial curves according to an embodiment of the present invention.

Referring now to FIG. 4, an example graph 200 of a number of polynomial curves 210-1, 210-2, 210-6 generated using a polynomial curve-fitting technique according to an embodiment of the present invention is shown. As illustrated, graph 200 has a number of data points 206A-N, with each data point 206N indicating the location of a single holographic projecting mobile device 86N (FIG. 2). As also illustrated, a first order (linear) fit curve 210-1, a second order fit curve 210-2, and a sixth order fit curve 210-6 have been plotted on graph 200.

Figure 5:
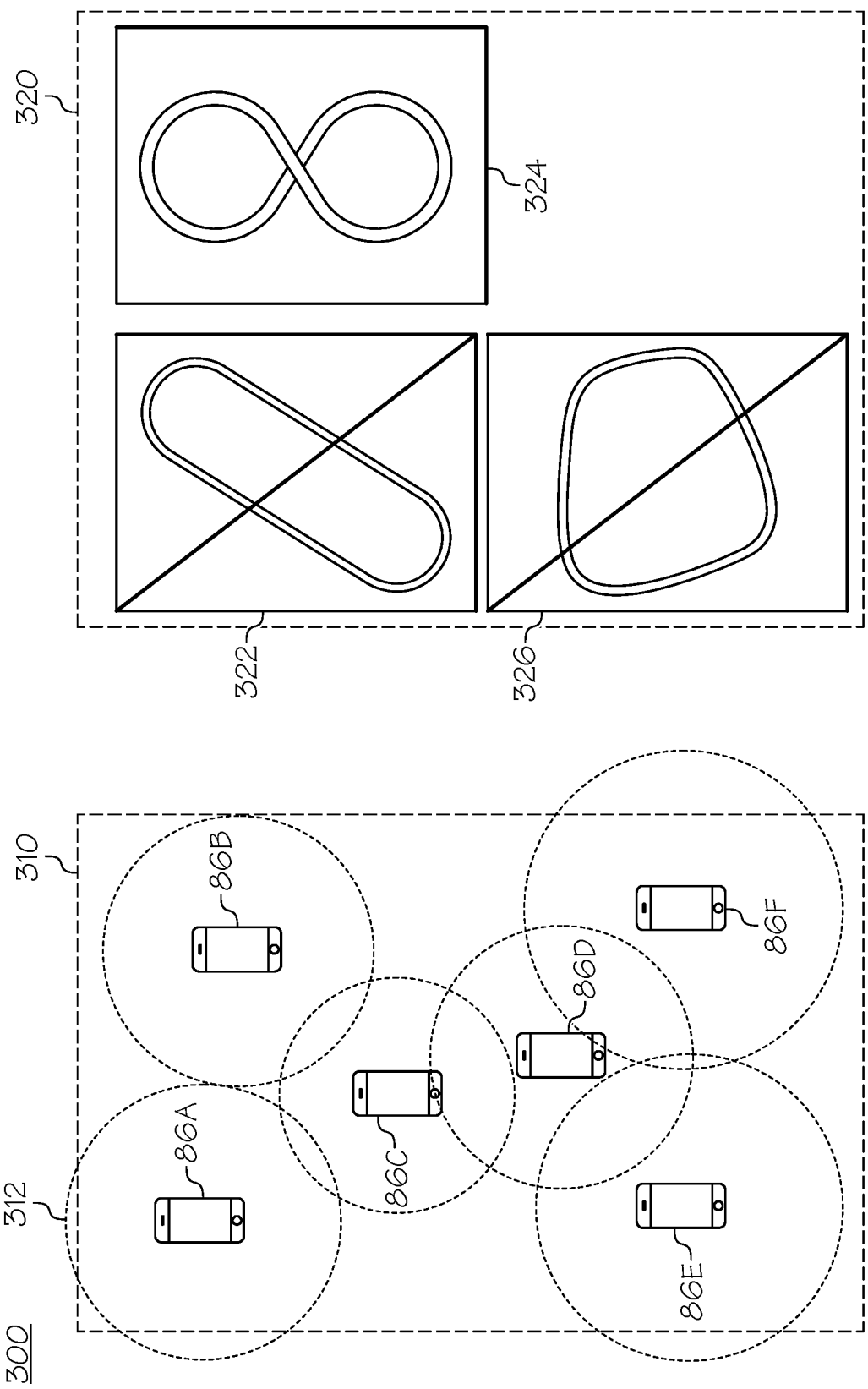
FIG. 5 shows an example scenario according to an embodiment of the present invention.

Referring now to FIG. 5, an example scenario 300 in which possible holographic object path determiner 92 may operate according to an embodiment of the present invention is shown. Referring additionally to FIG. 2, scenario 300 can be thought of as a continuation of the previously described racing game application 74 example described above. In any case, scenario 300 includes a physical area 310 in which a plurality of holographic projecting mobile devices 86A-F are present. Each of the holographic projecting mobile devices 86A-F has a projection range 312 gathered from the technical information by holographic projecting mobile device identifier 90 (FIG. 2). In the particular case of scenario 300, holographic projecting mobile devices 86A-F are aligned in a rough capital "I" shape, with holographic projecting mobile devices 86A-B and 86E-F being clustered at opposite ends of physical area 310 and holographic projecting mobile devices 86C-D being arranged towards the middle of physical area 310. Scenario 300 also includes a set of possible holographic object paths 320 that are supported by the application. As shown, this set of possible holographic object paths 320 includes an oval track 322, a figure-eight track 324, and a roughly trapezoidal track 326. Based on the locations and projection ranges 312 of holographic projecting mobile devices 86A-F in physical area 310, possible holographic object path determiner 92 has determined that it is possible to project a holographic object 120 (FIG. 3) along figure-eight track 324 but not along either of oval track 322 or roughly trapezoidal track 326.

To rectify this and/or to optimize holographic object path 324 that is currently displayable, in an embodiment, possible holographic object path determiner 92 is configured to enable the display of one or more possible holographic object paths 320 that cannot currently be displayed based on the current locations and projection ranges 312 of holographic projecting mobile devices 86A-F in physical area 310. For example, in scenario 300, the possible holographic object paths 320 that cannot currently be displayed would include oval track 322 and roughly trapezoidal track 326. In order to accomplish this, possible holographic object path determiner 92 (FIG. 2) can determine a set of new locations for holographic projecting mobile devices 86A-F that would enable holographic projecting mobile devices 86A-F to display a new holographic object path. This determination could be made automatically or, alternatively, could be made in response to a selection of a holographic path 322 or 326 that cannot be currently displayed by user 80. In any case, in scenario 300, the set of new locations necessary to display oval track 322 may require holographic projecting mobile devices 86C-D to be relocated from the center portion of physical space 310 further toward the edges.

Based on this determination, possible holographic object path determiner 92 can forward a suggestion for a new location that one or more of holographic projecting mobile devices 86C-D should be relocated to in order to enable the display of the particular holographic object path 320. In an embodiment, the new locations could be generated by controlling device node 86A and sent from controlling device node 86A to whichever secondary nodes 86B-N need to be relocated. In an embodiment, the directions for moving each node could include displaying an arrow or other direction indicator on the screen of the secondary node 86N that needs to be moved.

Figure 6:
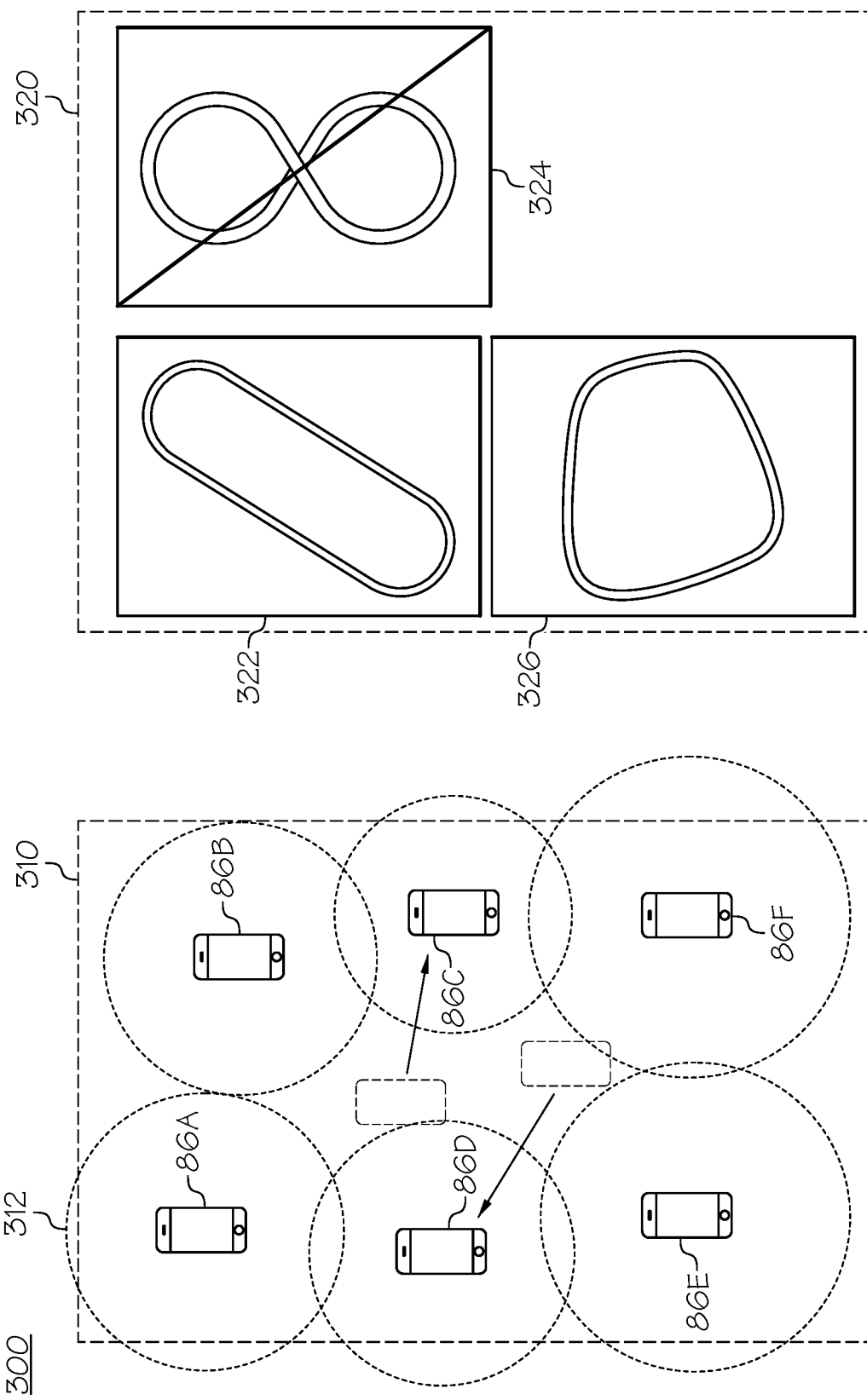
FIG. 6 shows an example updated scenario according to an embodiment of the present invention.

Referring now to FIG. 6, an example updated scenario 350 according to an embodiment of the present invention is shown. As shown, holographic projecting mobile devices 86C and 86D have each been relocated from their previous locations to new locations that were suggested by possible holographic object path determiner 92 (FIG. 2). As shown, these relocations have enabled the projection of holographic object 120 (FIG. 3) along either of oval track 322 or roughly trapezoidal track 326 but have disabled the ability to project holographic object 120 along figure-eight track 324.

Referring again to FIG. 2, holographic object path selector 94 of system 72, as executed by computer system/server 12, is configured to select a holographic object path 88N from the set of holographic object paths 88A-N. To this extent, once possible holographic object path determiner 92 has determined which holographic object paths 88A-N are able to be displayed using the current configuration of holographic projecting mobile devices 86A-N, holographic object path selector 94 can enable selection of one of holographic object paths 88A-N along which holographic object 120 is to be displayed. In an embodiment, this selection could include displaying the displayable holographic object paths 88A-N to one or more users 80 of holographic projecting mobile devices 86A-N using a graphical user interface and receiving a selection of a holographic object path 88N via the interface. In cases in which a controlling device node 86A is designated, this selection could be made by user 80 of controlling device node 86A. Alternatively, the preferences of multiple users 80 (by vote, etc.) could be factored into making the selection. In an alternative environment, holographic object path selector 94 could make the selection automatically. Such an automatic selection could be made based on such factors as stored preferences of one or more of the users 80, which holographic object path 86N is the most complicated, which holographic object path 86N is most popular among all users of application 74, randomly, etc.).

Referring again to FIG. 2 in conjunction with FIG. 3, pathed holographic object projector 96 of system 72, as executed by computer system/server 12, is configured to project, by holographic projecting mobile devices 86A-N, holographic object 120 moving according to the selected holographic object path 88N. In cases in which a controlling device node 86A is designated, controlling device node 86A can control secondary device nodes 86A-N to perform the projecting. Alternatively, holographic projecting mobile devices 86A-N could collaborate on a peer-to-peer basis to project the holographic image 110 containing the moving holographic object 120. To this extent, pathed holographic object projector 96 enables holographic projecting mobile devices 86A-N to collaborate with one another to project a visible holographic movement path, if desired. Further, pathed holographic object projector 96 allows the holographic projecting mobile devices 86A-N to collaborate with one another to project one or more holographic objects 120 moving according to (e.g., along, over, under, within, etc.) selected holographic object path 88N. As such, the movement of holographic object 120 can appear seamless (e.g., without interruption when projection of holographic object 120 transitions between one holographic projecting mobile device 86N and another).

In order to accomplish this, a first holographic projecting mobile device 84B can project holographic object 120 moving along a first section of holographic object path 88 that is associated with (e.g., within the projection range) of first holographic projecting mobile device 84B. Pathed holographic object projector 96 can calculate a transition point between the first section of holographic object path 88 and a second section of holographic object path 88 that is associated with a second holographic projecting mobile device 84C. In cases in which a controlling device node 84A has been designated, the calculation of the transition point can be calculated by controlling device node 84A. Alternatively, the first holographic projecting mobile device 84B and second holographic projecting mobile device 84C and/or other holographic projecting mobile devices 84A-N can collaborate to perform the calculation. In any case, when the movement of holographic object 120 along holographic object path 88 causes all or a portion of holographic object 120 to arrive at the transition point, the first holographic projecting mobile device 84B ceases its projection of all or the portion of the holographic object 120. Simultaneously, the arrival of holographic object 120 at the transition point causes second holographic projecting mobile device 84C to begin projection of all or the portion of the holographic object 120. Thereafter, the second holographic projecting mobile device 84C continues to project the holographic object 120 along holographic object path 88 for as long as holographic object path 88 is within its projection range, at which point holographic object 120 can be transitioned to a third holographic projecting mobile device 84N using the same processes.

Figure 7:
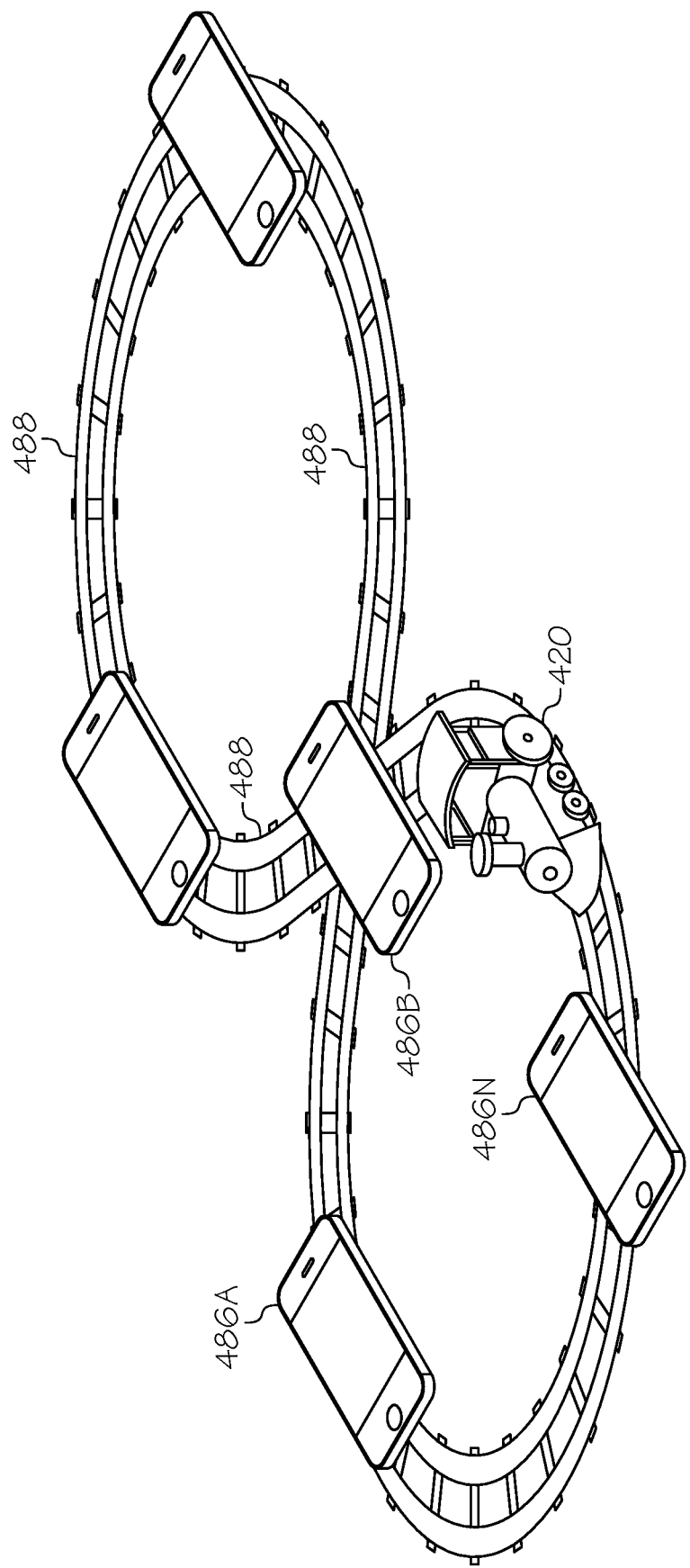
FIG. 7 shows an example holographic projection according to an embodiment of the present invention.

Referring now to FIG. 7, an example holographic projection 400 according to an embodiment of the present invention is shown. As illustrated, a plurality of holographic projecting mobile devices 484A-N is projecting a holographic object path 488, which, in this case, is a train track. Holographic projecting mobile devices 484A-N are also projecting a holographic object 420, which, in this case, is a train, as it moves according to holographic object path 488. It should be understood that the holographic projection 400 is not limited to a single holographic object 420. Rather, multiple holographic objects 420 could be projected moving along holographic object path 488. In an embodiment (e.g., in the racing game example described above), each of the multiple holographic object 420 could be associated with a different one of holographic projecting mobile devices 484A-N and changes in movement, speed, etc., of each holographic object 420 could be controlled by the corresponding holographic projecting mobile device 484N.

Referring again to FIG. 2 in conjunction with FIG. 3, pathed holographic object projector 96 can also suspend projecting holographic object 120 moving according to the selected holographic object path 88N in response to one or more events. These events can include the entry of one or more holographic projecting mobile devices 86A-N into the physical area, an exit of one or more holographic projecting mobile devices 86A-N from the physical area, or a repositioning of one or more holographic projecting mobile devices 86A-N within the physical area and/or the like. To accomplish this, holographic projecting mobile device identifier 90 can continue to identify holographic projecting mobile devices 86A-N within the physical area. If holographic projecting mobile device identifier 90 detects one or more events, possible holographic object path determiner 92 can determine a new set of holographic object paths 88A-N that can be projected using the new configurations of holographic projecting mobile devices 86A-N. A holographic object path 88N can be selected from among the newly determined set of holographic object paths 88A-N, and the holographic object 120 can be projected on the selected holographic object path 88N.

Figure 8:
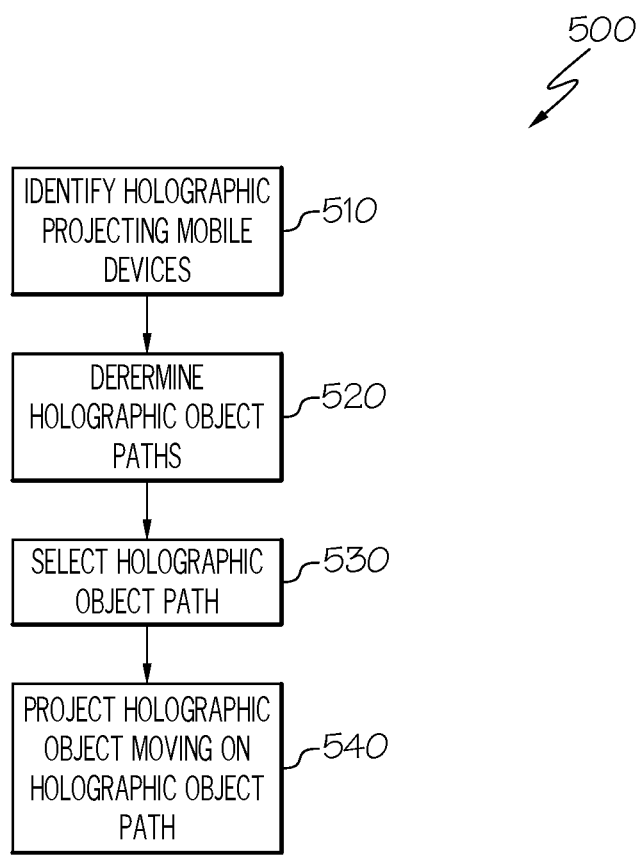
FIG. 8 shows an example process flowchart according to an embodiment of the present invention.

Referring now to FIG. 8 in conjunction with FIG. 2, a method flowchart 500 according to an embodiment of the present invention is shown. At 510, holographic projecting mobile device identifier 90 of system 72, as executed by computer system/server 12, identifies a plurality of holographic projecting mobile devices 86A-N within a physical area. At 520, possible holographic object path determiner 92 of system 72, as executed by computer system/server 12, determines a set of holographic object paths 88A-N that can be projected using the plurality of holographic projecting mobile devices 86A-N. At 530, holographic object path selector 94 selects a holographic object path 88N from the set of holographic object paths 88A-N. At 540, pathed holographic object projector 94 of system 72, as executed by computer system/server 12, projects, by the plurality of holographic projecting mobile devices 86A-N, a holographic object 120 moving according to the selected holographic object path 88N.

Process flowchart 500 of FIG. 8 illustrates the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit including custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, include one or more physical or logical blocks of computer instructions, which may, for instance, be organized as an object, procedure, or function. Nevertheless, the executables of an identified system or unit need not be physically located together, but may include disparate instructions stored in different locations which, when joined logically together, include the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for enhancing a view of an object by tracking the object with a 3-D holographic projection. Thus, embodiments herein disclose a process for supporting computer infrastructure, including integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for enhancing a view of an object by tracking the object with a 3-D holographic projection. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands including words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a hardware storage device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to project holographic object trackers. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for providing a holographic projection, comprising:
    identifying a plurality of holographic projecting mobile devices within a physical area;
    determining a set of holographic object paths that can be projected using the plurality of holographic projecting mobile devices, the determining including retrieving a set of supported holographic object paths that are supported by an application and analyzing the set of supported holographic object paths using curve fitting techniques, taking into account a relative size of and characteristics of a holographic object;
    selecting a holographic object path from the set of holographic object paths; and
    projecting, by the plurality of holographic projecting mobile devices, a composite holographic image that includes a holographic object moving according to the holographic object path.

2. The method of claim 1, further comprising:
    ascertaining a set of locations corresponding of each of the plurality of holographic projecting mobile devices within the area,
    wherein the set of holographic object paths is determined based on the set of locations.

3. The method of claim 2, further comprising:
    determining a set of projection ranges corresponding of each of the plurality of holographic projecting mobile devices within the area,
    wherein the set of holographic object paths is determined based additionally on the set of projection ranges.

4. The method of claim 1, further comprising:
    designating one holographic projecting mobile device of the plurality of holographic projecting mobile devices as a controlling device node and non-designated projecting mobile devices as secondary device nodes; and
    controlling, by the controlling device node, the secondary device nodes to perform the projecting.

5. The method of claim 1, the projecting further comprising:
    projecting, by a first holographic projecting mobile device of the plurality of holographic projecting mobile devices, the holographic object moving along a first section of the holographic object path associated with the first holographic projecting mobile device;
    calculating a transition point between the first section of the holographic object path and a second section of the holographic object path that is associated with a second holographic projecting mobile device of the plurality of holographic projecting mobile devices;
ceasing the projecting of the holographic object by the first holographic projecting mobile device in response to an arrival of the holographic object at the transition point; and
beginning a projection of the holographic object by the second holographic projecting mobile device in response to the arrival of the holographic object at the transition point.

6. The method of claim 1, further comprising:
detecting for a relocation of a relocated holographic projecting mobile device of the plurality of holographic projecting mobile devices within the area;
detecting for an addition of an additional holographic projecting mobile device to the plurality of holographic projecting mobile devices within the area;
detecting for a removal of a removed holographic projecting mobile device from the plurality of holographic projecting mobile devices within the area; and
revising the set of holographic object paths that can be projected by the plurality of holographic projecting mobile devices based on a detection of any of the relocation, the addition, or the removal.

7. The method of claim 1, further comprising:
determining a set of new locations configured to enable a new holographic object path; and
forwarding a suggestion for a new location for a holographic projecting mobile device based on the determining.

8. A computer system for providing a holographic projection, the computer system comprising:
a holographic projecting mobile device;
a holographic projector controlled by the holographic projecting mobile device;
a memory medium in the holographic projecting mobile device comprising program instructions;
a bus in the holographic projecting mobile device coupled to the memory medium; and
a processor coupled to the bus in the holographic projecting mobile device that executes the program instructions, causing the system to:
identify a plurality of holographic projecting mobile devices within a physical area;
determine a set of holographic object paths that can be projected using the plurality of holographic projecting mobile devices, the determining including retrieving a set of supported holographic object paths that are supported by an application and analyzing the set of supported holographic object paths using curve fitting techniques, taking into account a relative size of and characteristics of a holographic object;
select a holographic object path from the set of holographic object paths; and
project, by the plurality of holographic projecting mobile devices, a composite holographic image that includes a holographic object moving according to the holographic object path.

9. The computer system of claim 8, the instructions further causing the system to:
ascertain a set of locations corresponding of each of the plurality of holographic projecting mobile devices within the area,
wherein the set of holographic object paths is determined based on the set of locations.

10. The computer system of claim 9, the instructions further causing the system to:
determine a set of projection ranges corresponding of each of the plurality of holographic projecting mobile devices within the area,
wherein the set of holographic object paths is determined based additionally on the set of projection ranges.

11. The computer system of claim 8, the instructions further causing the system to:
designate the holographic projecting mobile device as a controlling device node and the identified projecting mobile devices as secondary device nodes; and
control, by the controlling device node, the secondary device nodes to perform the projecting.

12. The computer system of claim 8, the instructions causing the system to project further causing the system to:
project, by a first holographic projecting mobile device of the plurality of holographic projecting mobile devices, the holographic object moving along a first section of the holographic object path associated with the first holographic projecting mobile device;
calculate a transition point between the first section of the holographic object path and a second section of the holographic object path that is associated with a second holographic projecting mobile device of the plurality of holographic projecting mobile devices;
cease the projecting of the holographic object by the first holographic projecting mobile device in response to an arrival of the holographic object at the transition point; and
begin a projection of the holographic object by the second holographic projecting mobile device in response to the arrival of the holographic object at the transition point.

13. The computer system of claim 8, the instructions further causing the system to:
detect for a relocation of a relocated holographic projecting mobile device of the plurality of holographic projecting mobile devices within the area;
detect for an addition of an additional holographic projecting mobile device to the plurality of holographic projecting mobile devices within the area;
detect for a removal of a removed holographic projecting mobile device from the plurality of holographic projecting mobile devices within the area; and
revise the set of holographic object paths that can be projected by the plurality of holographic projecting mobile devices based on a detection of any of the relocation, the addition, or the removal.

14. The computer system of claim 8, the instructions further causing the system to:
determine a set of new locations configured to enable a new holographic object path; and
forward a suggestion for a new location for a holographic projecting mobile device based on the determining.

15. A computer program product for providing a holographic projection, the computer program product comprising a computer readable storage device, and program instructions stored on the computer readable storage device, to:
identify a plurality of holographic projecting mobile devices within a physical area;
determine a set of holographic object paths that can be projected using the plurality of holographic projecting mobile devices, the determining including retrieving a set of supported holographic object paths that are supported by an application and analyzing the set of supported holographic object paths using curve fitting techniques, taking into account a relative size of and characteristics of a holographic object;

select a holographic object path from the set of holographic object paths; and project, by the plurality of holographic projecting mobile devices, a composite holographic image that includes a holographic object moving according to the holographic object path.

16. The computer program product of claim 15, the computer readable storage device further comprising instructions to:

ascertain a set of locations corresponding of each of the plurality of holographic projecting mobile devices within the area, determine a set of projection ranges corresponding of each of the plurality of holographic projecting mobile devices within the area, wherein the set of holographic object paths is determined based on the set of locations and the set of projection ranges.

17. The computer program product of claim 16, the computer readable storage device further comprising instructions to:

designate one holographic projecting mobile device of the plurality of holographic projecting mobile devices as a controlling device node and non-designated projecting mobile devices as secondary device nodes; and control, by the controlling device node, the secondary device nodes to perform the projecting.

18. The computer program product of claim 15, the instructions to project stored on the computer readable storage device further comprising instructions to:

project, by a first holographic projecting mobile device of the plurality of holographic projecting mobile devices, the holographic object moving along a first section of the holographic object path associated with the first holographic projecting mobile device;

calculate a transition point between the first section of the holographic object path and a second section of the holographic object path that is associated with a second holographic projecting mobile device of the plurality of holographic projecting mobile devices;

cease the projecting of the holographic object by the first holographic projecting mobile device in response to an arrival of the holographic object at the transition point; and begin a projection of the holographic object by the second holographic projecting mobile device in response to the arrival of the holographic object at the transition point.

19. The computer program product of claim 15, the computer readable storage device further comprising instructions to:

detect for a relocation of a relocated holographic projecting mobile device of the plurality of holographic projecting mobile devices within the area;

detect for an addition of an additional holographic projecting mobile device to the plurality of holographic projecting mobile devices within the area;

detect for a removal of a removed holographic projecting mobile device from the plurality of holographic projecting mobile devices within the area; and revise the set of holographic object paths that can be projected by the plurality of holographic projecting mobile devices based on a detection of any of the relocation, the addition, or the removal.

20. The computer program product of claim 15, the computer readable storage device further comprising instructions to:

determine a set of new locations configured to enable a new holographic object path; and forward a suggestion for a new location for a holographic projecting mobile device based on the determining.

\* \* \* \* \*